United States Patent
Coughlan et al.

(10) Patent No.: US 8,130,935 B1
(45) Date of Patent: Mar. 6, 2012

(54) ROUTING OF CALLS BASED ON AGENTS EMOTIONAL STATE

(75) Inventors: Marc Coughlan, Balmain (AU); Alexander Forbes, Westleigh (AU); Ciarron Gannon, Sydney (AU); Peter D. Runcie, Bilgola Plateau (AU); Ralph Warta, Gladesville (AU)

(73) Assignee: Avaya Inc., Basking Ridge, NJ (US)

( * ) Notice: Subject to any disclaimer, the term of this patent is extended or adjusted under 35 U.S.C. 154(b) by 827 days.

(21) Appl. No.: 11/857,218

(22) Filed: Sep. 18, 2007

(51) Int. Cl.
*H04M 3/00* (2006.01)
*H04M 5/00* (2006.01)

(52) U.S. Cl. ......... 379/265.07; 379/265.02; 379/265.06; 379/265.12

(58) Field of Classification Search ............. 379/265.02, 379/265.06, 265.07, 265.12
See application file for complete search history.

(56) References Cited

U.S. PATENT DOCUMENTS

| | | | |
|---|---|---|---|
| 6,700,971 B1* | 3/2004 | Cohen et al. | 379/265.06 |
| 2003/0028390 A1* | 2/2003 | Stern et al. | 705/1 |
| 2004/0202308 A1* | 10/2004 | Baggenstoss et al. | 379/265.06 |
| 2004/0249650 A1* | 12/2004 | Freedman et al. | 705/1 |
| 2007/0003032 A1* | 1/2007 | Batni et al. | 379/88.19 |
| 2007/0121824 A1* | 5/2007 | Agapi et al. | 379/88.18 |

OTHER PUBLICATIONS

"Avaya Advanced Segmentation Routing and NICE Perform™ Provide Customer Data Controlled Routing" © 2006 (http://www.avaya.com/mater-use/en-us/resource/assessts/brochures/avaya%20and%20nice%20-%20customer%20data%20controlled%20routing%20broichure%20-%20gcc3242.pdf) 2 pages.
"Analyze This" NICENEW Insight from Interactions Summer Edition Jul. 2006 (http://www.nice/com/news/newsletter/6_07/analyze.php) 4 pages.

* cited by examiner

*Primary Examiner* — Ahmad Matar
*Assistant Examiner* — Nafiz E Hoque
(74) *Attorney, Agent, or Firm* — Sheridan Ross P.C.

(57) ABSTRACT

An agent's emotional state is used to assist with determining how to route an incoming communication. The factoring in of emotional state can be combined with other performance metrics that can include, for example, any suitable metric for expressing or describing agent performance or agent skill level. For example, the metrics can include revenue generated, revenue generation rate, profitability, profitability generation rate, number of units sold, rate of unit sales, average duration of the contact, a rating quantifying the agents proficiency in handling a contact, the occurrence of a trouble ticket, agent requests assistance, a no sale situation, customer satisfaction indicators, customer attention, value of collections, time to close a sale, one-and-done, and/or any other metric indicating the customer's relationship with the business.

20 Claims, 3 Drawing Sheets

Agent X

| | Date | Time | Call ID | Emotion Before | Emotion During | Emotion After | Call Duration | Current Emotional State | Agent Available? | Action |
|---|---|---|---|---|---|---|---|---|---|---|
| Call 1 | 1/2 | 8:00 | C1 | H | H | H | 1:44 | H | Y | P |
| Call 2 | 1/2 | 8:14 | C43 | F | A | F | 28:24 | F | N | B |
| Call 3 | 1/2 | 15:23 | C3x5 | U | U | U | 0:45 | U | Y | P |
| Call 4 | 1/2 | 16:10 | C54F | A | H | H | 3:33 | H | Y | A |
| Call 5 | 1/2 | 17:03 | X124 | T | T | H | 4:44 | H | Y | P |
| Call 6 | 1/3 | 17:05 | J0.1 | HU | F | F | 1 hr | FA | N | T |
| ⋮ Call n | | | | | | | | | | |

Emotion Key:
H = Happy
U = Upbeat
A = Angry
F = Frustrated
T = Tired

Action Key:
B = Break
V = Vacation
A = Award
P = Prepare for Next Call
T = Training

Fig. 2

ROUTING OF CALLS BASED ON AGENTS EMOTIONAL STATE

An exemplary embodiment of the present invention is directed to call routing. More specifically, an exemplary embodiment is directed toward routing of calls based on an emotional state of a recipient, such as a call agent.

BACKGROUND OF THE INVENTION

Contact centers, such as automatic call distribution or ACD systems, are employed by many enterprises to serve customer contacts. A typical contact center includes a switch and/or server to receive and route incoming packet-switched and/or circuit-switched contacts and one or more resources, such as human agents and automated resources (e.g., interactive voice response (IVR) units), to service the incoming communications. Contact centers distribute contacts, whether inbound or outbound for servicing to any suitable resource according to predetermined criteria. In many existing systems, the criteria for servicing the contact from the moment that the contact center becomes aware of the contact and until the contact is connected to an agent or customer-specifiable (i.e., programmable by the operator of a contact center), via a capability called vectoring. In present-day ACDs, when the ACD system's controller detects that an agent has become available to handle a contact, the controller identifies all pre-defined contact-handling skills of the agent (usually in some order of priority) and delivers to the agent the highest-priority oldest contact that matches the agent's highest priority skill. Generally, the one condition that results in a contact not being delivered to an available agent is that there is no contact waiting to be handled.

Most contact-distribution algorithms focus on being "fair" to contactors and to agents. This fairness is reflected by the standard first-in, first-out, to most-idle-agent assignment algorithm. Skills-based routing improves upon this basic algorithm in that it allows each agent to be slotted into a number of agent groups based on the agent's skill type and level.

One objective of contact-distribution algorithms is to ultimately maximize contact center performance, profitability and to reduce hold time. This may involve minimizing cost, maximizing contact throughput and/or maximizing revenue, among other things. For example, when a new contact arrives, the contact should be handled by an agent who either has the ability to produce the most revenue or can handle the contact in the shortest amount of time. Also, when an agent becomes available to handle a new contact, the agent should handle the contact that has the possibility of generating the most revenue or the contact which the agent is most efficient in handling.

Currently, agent trends or patterns, if tracked at all, are tracked by the supervisor of the agent. The supervisor may manually assign agents to perform certain tasks based on their peak performance periods. This method of operation can have a number of drawbacks. For example, the supervisor has numerous tasks in a day and generally does not have time or energy to develop a complete understanding of each agent's performance trends and agent turnover rates can be high. It is often the case that the supervisor assigns an agent to perform a task that coincides with the agent's slow performance because of the incoming workload. The method does not balance current contact center needs with the agent performance trends, without the manual intervention of the supervisor.

SUMMARY OF THE INVENTION

Another drawback of currently used techniques is that agents' emotional state is not factored in the determination of how a call should be routed. An exemplary embodiment of the present invention factors in an agent's emotional state in determining how to route the communication.

The factoring in of emotional state can be combined with other performance metrics that can include, for example, any suitable metric for expressing or describing agent performance or agent skill level, or agent availability. For example, the metrics can include revenue generated, revenue generation rate, profitability, profitability generation rate, number of units sold, rate of unit sales, average duration of the contact, a rating quantifying the agents proficiency in handling a contact, the occurrence of a trouble ticket, agent requests assistance, a no sale situation, customer satisfaction indicators, customer attention, value of collections, time to close a sale, one-and-done, and/or any other metric indicating the customer's relationship with the business.

Incoming communications may be handled in real-time or non-real-time and the corresponding emotional state of the agent tracked therewith. A real-time communication refers to a contact in which the customer is present during the waiting (or queuing) period and can choose to abandon or disconnect the contact if it is not serviced within an acceptable period of time. Common examples include voice contacts, VoIP, text-chat, video contacts, multimedia sessions, and the like. A non-real-time contact refers to a contact in which the contacting entity or customer is unable to abandon or disconnect the contact. Common examples include e-mail, fax, electronic or paper documents, web submissions, voicemail messages, and the like.

The emotional state of several agents can also be tracked and factored into call routing where several agents are in call queues for the purpose of receiving incoming communications. In addition, and in accordance with known procedures, the emotional state of the incoming contact can be utilized in conjunction with the emotional state of one or more agents within the call center for appropriate routing of that contact. These can of course also be combined with other factors such as performance metrics, availability, and other well known call routing procedures, policies and algorithms used in the call routing industry for forwarding of contacts to an appropriate call center agent.

These and other advantages will be apparent from the disclosure of the inventions disclosed herein.

The above described embodiments and configurations are neither complete nor exhaustive. As will be appreciated, other embodiments of the invention are possible utilizing, alone or in combination, one or more features as set forth above or described in detail below.

BRIEF DESCRIPTION OF THE DRAWINGS

Exemplary embodiments of the invention will be described in detail, with reference to the following figures wherein:

FIG. 2 illustrates an exemplary agent profile associated with this invention.

DETAILED DESCRIPTION

Figure 1:
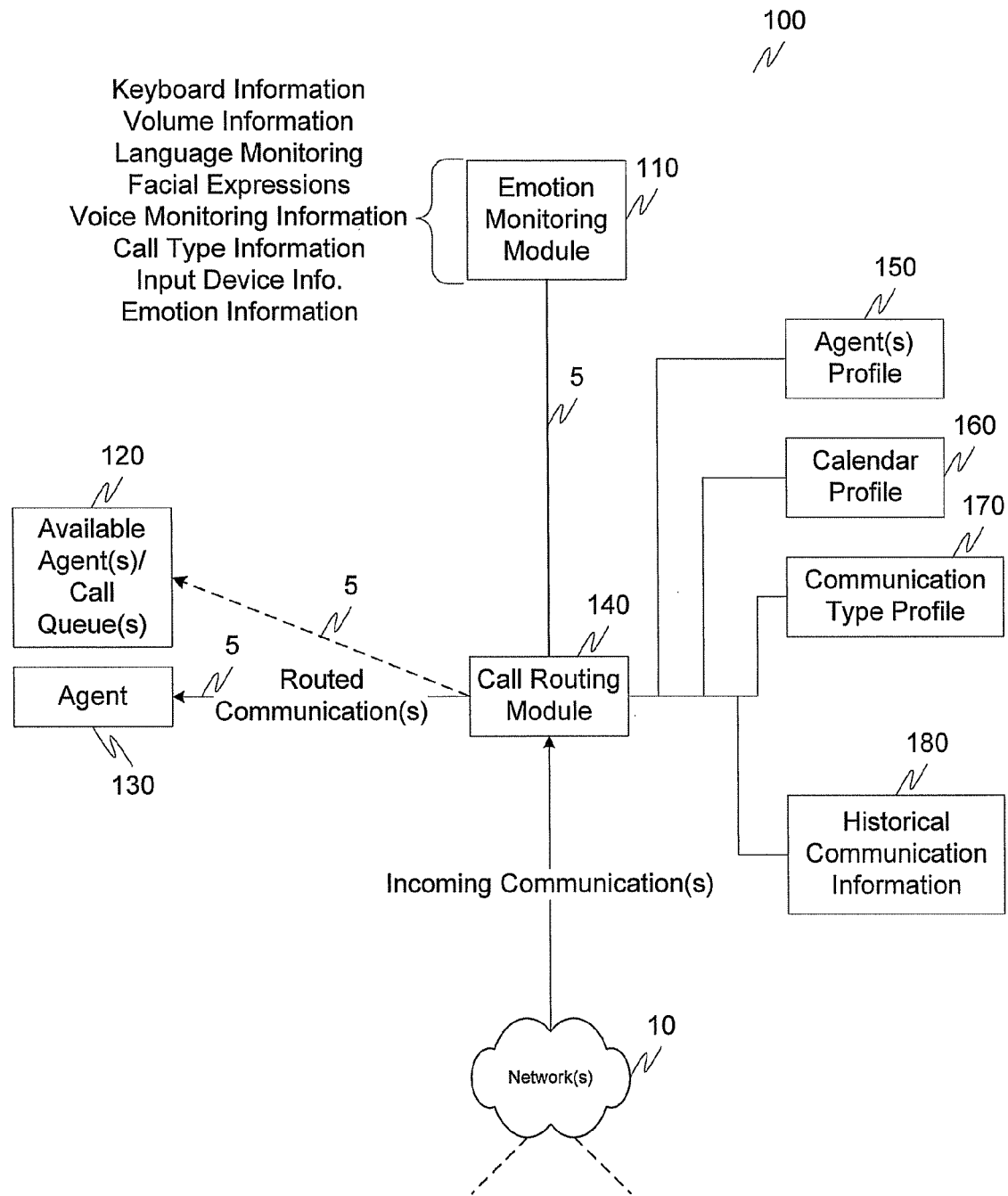
FIG. 1 illustrates an exemplary call routing system according to this invention.

Exemplary embodiments of this invention will be described in relation to communication routing. However, it should be appreciated, that in general, the systems and methods of this invention will work well for any type of communication routing in any environment.

The exemplary systems and methods of this invention will also be described in relation to telecommunication systems and associated telecommunication hardware, software and communication channels. However, to avoid unnecessarily obscuring the present invention, the following description omits well-known structures, network components and devices that may be shown in block diagram form, are well-known, or are otherwise summarized.

For purposes of explanation, numerous details are set forth in order to provide a thorough understanding of the present invention. It should be appreciated, however that the present invention may be practiced in a variety of ways beyond the specific details set forth herein.

Furthermore, while the exemplary embodiments illustrated herein show the various components of the system collocated, it is to be appreciated that the various components of the system can be located at distant portions of a distributed network, such as a telecommunications network and/or the Internet or within a dedicated secure, unsecured and/or encrypted system. Thus, it should be appreciated that the components of the system can be combined into one or more devices, such as a PBX or communications device, associated with an ACD system, or the like, or collocated on a particular node of a distributed network, such as an analog and/or digital telecommunications network, a circuit-switched network and/or a packet-switched network. As will be appreciated from the following description, and for reasons of computational efficiency, the components of the system can be arranged at any location within a distributed network without affecting the operation of the system. For example, the various components can be located within a PBX, at one or more users' premise, or some combination thereof. Similarly, one or more functional portions of the system could be distributed between a telecommunications device(s) and an associated computing device.

Additionally, the incoming contacts or communications can be from one or more of a telephone, laptop, personal computer, personal digital assistant, text messaging system, multimedia sessions, e-mail, fax, or in general any known or later developed system or means for communication.

Session Initiation Protocol or SIP, which is a simple signaling/application layer protocol for data network multimedia conferencing and telephony, can also be used with the present invention to provide, for example, a degree of presence awareness in a communication network. Although other protocols are equally supportive of presence concepts, SIP provides an illustrative basis for the present invention.

It should also be appreciated that various links, including any communications channels and the various links 5, connecting the elements, can be wired or wireless links, or any combination thereof, or any other well-known or later developed element(s) that is capable of supplying and/or communicating data to and from the connected elements. The term module as used herein can refer to any known or later developed hardware, software, firmware, or combination thereof that is capable of performing the functionality associated with that element. The terms determine, calculate and compute and variations thereof, as used herein are interchangeable and include any type of methodology, process, mathematical operation or technique. Furthermore, it is to be noted that that the term "a" or "an" entity refers to one or more of that entity. As such, the terms "a" or "an", "one or more" and "at least one" can be used interchangeably herein. It is also to be noted that the terms "comprising", "including" and "having" can be used interchangeably.

Also, while the flowcharts have been described in relation to a particular sequence of events, it should be appreciated that changes, additions and omissions to the sequence can occur without materially affecting the operation of the invention.

As will be appreciated, the call routing system 100 can also comprise other well known components which will now be described herein in detail. For example, the call routing system 100 can further include one or more telephony switches/media servers that can be of any architecture for directing communications to one or more communications devices. The network(s) 10 can and typically include proxies, registers, switches and routers that are well known. Incoming contacts or communications can be from communication devices (not shown) or can be any device or devices suitable for communication over the network to which they are connected. For example, the communication devices can be any wired or wireless phone such as an IP hard phone, IP soft phone, personal digital assistant, Blackberry®, Treo®, personal computer or PC, laptop, mobile phone, traditional PSTN phones, cellular phones, or any combination thereof.

The call routing system 100 comprises an emotion monitoring module 110, an available agent/call queue 120, one or more agents 130, a call routing module 140, an agent profile 150, a calendar profile 160, a communication type profile 170 and a historical communication information repository 180, all interconnected by one or more links 5 and network 10.

In operation, one or more communications or contacts originates and is transferred via one or more networks 10 and links 5 to the call routing module 140. As discussed, this call routing module 140 can be associated with one or more contact centers to assist with routing incoming communications to, for example, a destination within the call center. Upon receipt of an incoming communication by the call routing module 140, numerous checks can be performed and information about one or more of the incoming communication and one or more agents can be analyzed to determine appropriate routing of the communication.

For example, as is well known, and in conjunction with a communication type profile 170, the communication type can be determined for the incoming communication. This communication type can include information such as the nature of the call, the emotional state of the calling party, and can optionally be supplemented with information obtained from, for example, an IVR system. Additionally, calendaring information stored in the calendar profile can be used and this information can relate to, for example, the availability of one or more agents or call queues, or the like. Furthermore, information can be obtained from the historical communication information repository 180. This information can include, for example, information on when certain agents perform better based on historical tracking of the agent, and, as discussed above, one or more satisfaction metrics that may relate to one or more agents and one or more call queues, and/or one or more call centers.

The call routing module 140, having information available such as calendar information, communication type information, emotional information regarding the communication, type of communication, and the like, utilizes one or more of these factors in conjunction with the emotional state of an agent to determine correct routing of an incoming communication. For example, the emotion monitoring module 110 can monitor one or more of keyboard information, volume information, language monitoring information, facial expression information, voice monitoring information, call type information, input device information, emotion information, or in general any aspect associated with a particular agent(s) and use this information for determining appropriate routing of an incoming communication.

Various types of emotion monitoring systems and hardware are available, and will not be discussed in specificity herein, but it should be appreciated that in general any known or later developed emotion monitoring technique or system can be used in conjunction with the present invention to assist with determining appropriate routing of an incoming communication.

Thus, for example, the call routing module 140 can be configured to analyze various metrics, and for example, apply various weightings to one or more of these metrics with the metrics being optionally used in assisting with determining the appropriate routing of a call. At least one of the metrics can be based on the information obtained from the emotion monitoring module 110 and the weighting of this metric varied, for example, based on historical information, current call volume, call queue capacity, call center capacity, or in general any aspect related to the handling of incoming communications.

In addition to information regarding incoming communication(s) and current emotional state of an agent monitored by the emotion monitoring module 110, agent profile information can also be considered in conjunction with the agent profile 150. As discussed hereinafter in relation to FIG. 2, agent profile information can include such information as the historical log, for example, recent calls that have been handled, emotional state before, during and after the communication, the current state of the agent as well as whether the agent is or should be available and the recommended action to take based on one or more of this information and further information relating to the call center.

Utilizing the current emotional state of the agent in conjunction with more traditional metrics for call routing, the call routing module 140 determines the appropriate routing for the call and routes the incoming communication to a destination. In conjunction with this routing, the incoming communication is assigned a call identification that can be used, for example, in conjunction with tracking the call and correlating the call to the emotional state of the agent.

Upon transferring of the incoming communication to, for example, agent 130, the emotional state of the agent is monitored before, during and after the communication in accordance with well known techniques. This monitoring continues until the communication is terminated where one or more of the agent profile 150 and historical communication information 180 is updated.

Optionally, and based, for example, on the current emotional state of the agent and perhaps historical information, the agent profile 150 in conjunction with the associated processing module (not shown) can determine 1) whether the agent should be available for further communication, and 2) decide if a recommended action should be taken, based for example, on the agent's emotional state. These actions can include, for example, recommending the agent take a break, go on vacation, receive an award, prepare for the next call, receive training, or in general, be any action as appropriate.

These actions can be communicated to the agent and/or in general any entity (e.g., a supervisor) in traditional ways, such as an e-mail message, text message, message displayed on a user interface, or in general, any known method of communicating messages to, for example, an employee such as a call center employee.

FIG. 2 illustrates an exemplary agent profile such as the one or more agent profiles stored in agent profile 150. This exemplary agent profile is for "Agent X" and includes information such as the call log for calls Call 1 thorough Call n and information relating to each call. In particular, this information can include the date, time, call ID, emotion before, emotion during, emotion after, call duration, current emotional state information, indicator as to whether the agent is available after the call and a recommended course of action. In this exemplary agent profile, the emotions have arbitrarily been chosen as happy, upbeat, angry, frustrated and tired. The actions have similarly been arbitrarily chosen as break, vacation, award, prepare for next call and training. For this exemplary agent profile, it can be seen that for Call 1 the agent maintained a happy state before, during and after the call, the agent was available after the call and the recommended action is to indicate to the agent to prepare for the next call.

For Call 2, the agent was frustrated before the call, angry during the call, and frustrated after the 28 minute call, with the agent maintaining a frustrated state. The system could then determine based on the frustrated state that the agent should not be available to receive further communications and recommend that the agent take a break before receiving a next communication. Call 3, later that same day, shows the agent is upbeat before during and after the call with the agent maintaining an upbeat state, and was recommended to be available for further communications and instructed to prepare for the next call.

For Call 4, the agent was angry at the onset of the call, happy during the call as well as after the call and appears to have maintained that happy state. Thus, the system recommends that the agent maintain availability and is, for example, identified as eligible for award based on, for example, superior performance.

For Call 5, which is later that same day, the agent is tired before and during the call however ended up happy at the end of the call and after the call. Again, the agent is recommended as being available and to prepare for a next call. Hybrid actions could also be used such that in conjunction with the eligibility for a break, the agent could also be presented an indication to prepare for the next call.

Similarly, and in relation to Call 6, it is noted that before the call the agent is in an upbeat and happy state while after Call 6, the agent ended up in a frustrated and angry state where it is not recommended that the agent take another call and, perhaps, training is required.

As will be appreciated, any type of emotion can be tracked in the agent profile. In a similar manner any type of appropriate action can be any action appropriate for the particular call center environment in which the call routing system 100 is implemented.

In conjunction with the historical communication information repository 180, information from the agent profile 150 can be incorporated therein and analyzed to, for example, assist with determining the appropriate action for population in the agent profile. For example, if over a six-month time frame it is observed that an agent is usually inefficient and not in an appropriate emotional state to accept calls between 7:00 and 8:30 on a Monday morning, call routing module 140 can use this information to, for example, not route e-mail or communication sessions to the agent during that timeframe.

The call center could also determine, for example, that angry clients usually call between 10:00 am and noon on Thursdays and use this information to appropriately staff the call center with happy, upbeat and patient agents. As will be appreciated, various types of data mining technologies can be used in conjunction with the present invention to analyze historical and current agent emotion and communication information to assist with the call routing module 140 for appropriate routing of the incoming communication.

Figure 3:
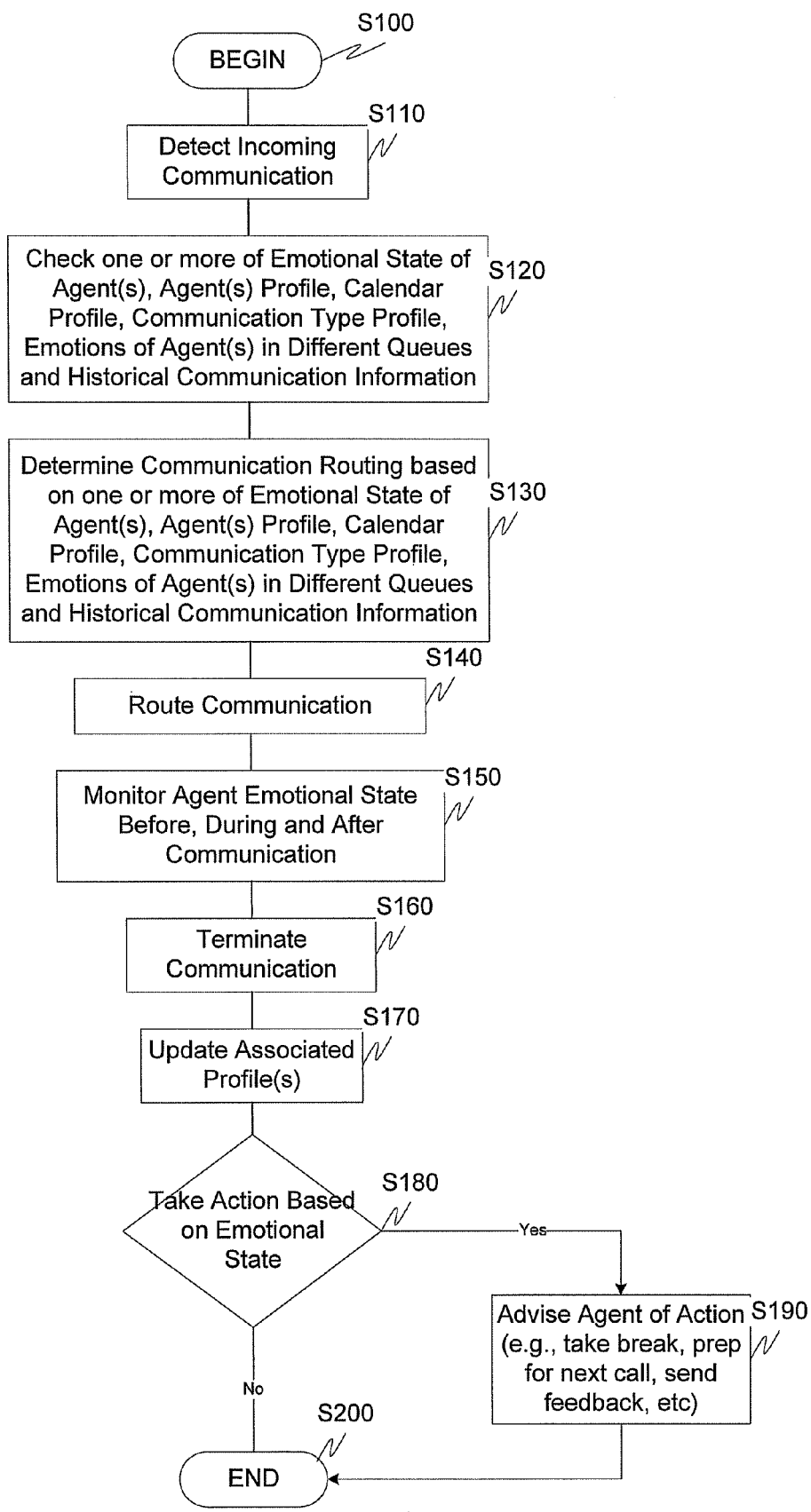
FIG. 3 is a flowchart illustrating an exemplary method for routing calls according to this invention.

FIG. 3 illustrates an exemplary method of operation for the call routing system 100. Control begins at step S100 and continues to step S110. In step S110, an incoming communication is detected. Next, in step S120, one or more of the emotional state of the agent, agent profile, calendar profile, communication type, emotion of agent in different queue, historical communication information, or in general any information related to either one or more agents, the call center and the incoming communication are obtained. As discussed, current emotional state of the agent can be related to one or more of pressure on the keyboard, facial expressions, language monitoring metrics, voice monitoring metrics, voice tone, typing speed, or in general any known technique used to detect, determine or monitor emotion.

Having the various types of information, a determination is made how to route the call at step S130. Next, in step S140, incoming communication is routed to a determined destination. Then, in step S150, an emotional state of the agent is monitored before, during and after the communication with the communication ending in step S160. Optionally, the emotional state can be monitored on a granular level and, for example, correlated to a specific portion of the communication with the incoming contact. This could then be used to evaluate how an agent performs during specific portions of a call and, for example, used for training or performance evaluation. Then in step S170, any appropriate profiles, such as the agents profile and historical communication information are updated. Control then continues to step S180.

In step S180, a determination is made whether an action should be recommended based on, for example, the emotional state of the agent. If an action is to be recommended, control continues to step S190. Otherwise, control jumps to step S200 where the control sequence ends.

In step S190, the agent, or alternatively or in addition, supervisor, peer, or in general, anyone associated with the call center, can be advised of the determined action. In accordance with a particular exemplary embodiment described herein, these actions can include but are not limited to a break, vacation, award, preparation for the next call, training, or the like.

In addition, information associated with the incoming communication can be used to predictably determine an emotional state of an agent. For example, if an incoming communication is determined to be a hostile customer calling with a complaint, an indicator can be sent to an agent(s) that upon the agent receiving this indicator the emotional state is monitored to see if, for example, the agent is unhappy about receiving the customer complaint, or perhaps use the call as a challenge for an upbeat agent who enjoys dealing with the angry customer. In this instance, for example, the call routing module 140 could use this information in addition to the other information to assist with determining the appropriate routing of the call. For example, knowing that upbeat call agents perform better and achieve more satisfactory results with hostile customers, call routing module 140 could take this into consideration upon determining the appropriate routing of the incoming communication.

As will be appreciated, there are technologies, systems and processes that are available to monitor emotions in one or more persons. The exemplary embodiments discussed herein can be used in conjunction with any of these systems, processes or techniques.

While FIG. 2 illustrates only six calls, it is to be appreciated that other calls could be taken by the agent in between the illustrated representative calls and this particular agent profile should not be considered as complete or exhaustive. Furthermore, the agent profile can be configured to include information from one or more time frames and can be configured to summarize any number of calls and/or time frames. Additionally, the agent profile may not be limited to a specific agent, but could also be directed toward the call queue with the emotional state of one or more agents within the call queue summarized in the agent profile. These basic concepts can be expanded to include, for example, an emotional state of a call center and in general could be scaled to any level as appropriate.

While the above-described flowcharts have been discussed in relation to a particular sequence of events, it should be appreciated that changes to this sequence can occur without materially effecting the operation of the invention. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

The above-described system can be implemented on wired and/or wireless telecommunications devices, such a telephone, mobile phone, PDA, a wired and/or wireless wide/local area network system, a satellite communication system, or the like, or on a separate programmed general purpose computer having a communications device(s) or in conjunction with any compatible communications protocol(s).

Additionally, the systems, methods and protocols of this invention can be implemented on a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a communications device, such as a phone, any comparable means, or the like. In general, any device capable of implementing a state machine that is in turn capable of implementing the methodology illustrated herein can be used to implement the various communication methods, protocols and techniques according to this invention.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and communications arts.

Moreover, the disclosed methods may be readily implemented in software that can be stored on a storage medium, executed on a programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications device or system.

It is therefore apparent that there has been provided, in accordance with the present invention, systems and methods for call routing. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

The invention claimed is:

1. A communication routing system comprising:
a call routing module and a processor that manage one or more incoming communications;
an emotion monitoring module that monitors an emotional state of one or more agents; and
an agent profile including information regarding the emotional state of one of the one or more agents, historical emotion information relating to one or more previous communications and a recommended action, wherein the emotional state, the historical emotion information and the recommended action are factored into determining a routing of the one or more incoming communications, and the historical information includes the emotional state of the agent before, during and after one or more of the one or more previous communications, wherein the emotional state, the historical emotion information and the recommended action are weighted before the determining of the routing of the one or more incoming communications, with the weightings being variable based on one or more of a current call volume, a call queue capacity and a call center capacity.

2. The system of claim 1, wherein the emotion monitoring module further monitors the emotional state of the one or more agents before, during and after the one or more incoming communications.

3. The system of claim 1, wherein the agent profile is updated with one or more of an action indicator and an emotion indicator.

4. The system of claim 1, wherein one or more actions based on the emotional state are forwarded to the one or more agents.

5. The system of claim 1, wherein the call routing module routes the one or more incoming communications based on the emotional state, the historical emotion information and the recommended action.

6. The system of claim 1, wherein the emotional state is attributable to one or more of call queues and call centers.

7. The system of claim 1, further comprising a communication type profile module that categorizes the one or more incoming communications.

8. The system of claim 1, further comprising a calendar profile that is updated with emotional state information.

9. The system of claim 1, wherein the emotional state is based on one or more of keyboard information, volume information, language information, facial expressions, voice monitoring information, call type information, input device information, emotion information and physiological information.

10. The system of claim 1, wherein the call routing is further based on one or more of revenue generated, revenue generation rate, profitability, profitability generation rate, number of units sold, rate of unit sales, average duration of a contact, a rating quantifying the agents proficiency in handling a contact, an occurrence of a trouble ticket, an agent assistance request, a no sale situation, customer satisfaction indicators, customer attention, value of collections, time to close a sale and one-and-done.

11. A communication routing method comprising:
monitoring an emotional state of one or more agents; and
determining, at least based on the emotional state of one of the one or more agents, historical emotion information relating to one or more previous communications and a recommended action, where to route one or more incoming communications, wherein the historical emotion information includes the emotional state of the agent before, during and after one or more of the one or more previous communications, wherein the emotional state, the historical emotion information and the recommended action are weighted before the determining of where to route the one or more incoming communications, with the weightings being variable based on one or more of a current call volume, a call queue capacity and a call center capacity; and
routing the communication to a destination.

12. The method of claim 11, further comprising monitoring the emotional state of the one or more agents before, during and after the one or more incoming communications.

13. The method of claim 11, further comprising updating an agent profile with one or more of an action indicator and an emotion indicator.

14. The method of claim 11, further comprising recommending one or more actions based on the emotional state.

15. The method of claim 11, further comprising routing the one or more incoming communications based on the emotional state, the historical emotion information and the recommended action.

16. The method of claim 11, wherein the emotional state is attributable to one or more of call queues and call centers.

17. The method of claim 11, further comprising categorizing the one or more incoming communications.

18. The method of claim 11, further comprising updating a calendar with emotional state information.

19. The method of claim 11, wherein the emotional state is based on one or more of keyboard information, volume information, language information, facial expressions, voice monitoring information, call type information, input device information, emotion information and physiological information.

20. The method of claim 11, wherein the incoming communication routing is further based on one or more of revenue generated, revenue generation rate, profitability, profitability generation rate, number of units sold, rate of unit sales, average duration of the contact, a rating quantifying the agents proficiency in handling a contact, an occurrence of a trouble ticket, an agent assistance request, a no sale situation, customer satisfaction indicators, customer attention, value of collections, time to close a sale and one-and-done.

* * * * *